(12) United States Patent
Teufelhart

(10) Patent No.: US 11,105,358 B2
(45) Date of Patent: Aug. 31, 2021

(54) DISTANCE SENSOR AT ANCHOR TIP

(71) Applicant: Hilti Aktiengesellschaft, Schaan (LI)

(72) Inventor: Stefan Teufelhart, Weite (CH)

(73) Assignee: Hilti Aktiengesellschaft, Schaan (LI)

( * ) Notice: Subject to any disclaimer, the term of this patent is extended or adjusted under 35 U.S.C. 154(b) by 289 days.

(21) Appl. No.: 16/322,563

(22) PCT Filed: Aug. 8, 2017

(86) PCT No.: PCT/EP2017/070082
§ 371 (c)(1),
(2) Date: Feb. 1, 2019

(87) PCT Pub. No.: WO2018/041558
PCT Pub. Date: Mar. 8, 2018

(65) Prior Publication Data
US 2019/0162219 A1    May 30, 2019

(30) Foreign Application Priority Data
Aug. 30, 2016    (EP) .................................... 16186306

(51) Int. Cl.
*F16B 13/08*    (2006.01)
*F16B 13/06*    (2006.01)

(52) U.S. Cl.
CPC ........ *F16B 13/0858* (2013.01); *F16B 13/065* (2013.01); *F16B 13/08* (2013.01)

(58) Field of Classification Search
CPC ...... F16B 1/0071; F16B 13/004; F16B 13/06; F16B 13/065; F16B 13/066; F16B 13/08; F16B 13/0858; F16B 19/1081; F16B 19/109; F16B 31/02; F16B 31/025; E21D 21/008

USPC ....................... 411/8, 9, 14, 18, 44, 60.1, 65
See application file for complete search history.

(56) References Cited

U.S. PATENT DOCUMENTS 4,094,223 A * 6/1978 Fischer ................... F16B 13/00
                                                                411/44
4,410,296 A * 10/1983 Unrug ..................... E21D 21/02
                                                                405/259.1
4,519,735 A * 5/1985 Machtle ................ F16B 13/066
                                                                411/65

(Continued)

FOREIGN PATENT DOCUMENTS

CN      101733735          6/2010
DE      4037077 A1        5/1992

(Continued)

OTHER PUBLICATIONS

International Search Report of PCT/EP2017/070082, dated Oct. 30, 2017.

*Primary Examiner* — Roberta S Delisle
(74) *Attorney, Agent, or Firm* — Davidson, Davidson & Kappel, LLC

(57) ABSTRACT

A fastening system is provided, including an anchor (1), which has an anchor area (22) in a front area (32) for anchoring the anchor in a hole (99) in a substrate (5), and a load receiving device (18) in a rear area (33) for introducing a tensile force. A sensor (40) is provided for measuring a distance of the front area from a reference position of the substrate. A measuring method, using a fastening system of this type is also provided.

17 Claims, 1 Drawing Sheet

(56) References Cited

U.S. PATENT DOCUMENTS

| | | | |
|---|---|---|---|
| 4,681,493 A * | 7/1987 | Vollmer | F16B 13/066 411/19 |
| 5,029,480 A | 7/1991 | Kibblewhite | |
| 5,176,481 A | 1/1993 | Schiefer | |
| 5,308,973 A | 5/1994 | Odoni et al. | |
| 5,545,987 A | 8/1996 | Schutt et al. | |
| 5,586,851 A | 12/1996 | Haage | |
| 7,857,564 B2 * | 12/2010 | Wieser | F16B 13/065 411/60.1 |
| 7,994,901 B2 | 8/2011 | Malis et al. | |
| 8,444,355 B2 * | 5/2013 | Gaudron | F16B 13/065 411/60.1 |
| 2002/0054805 A1 * | 5/2002 | Kaibach | F16B 13/065 411/60.1 |
| 2004/0215395 A1 * | 10/2004 | Strasser | B23B 49/006 702/9 |
| 2007/0098518 A1 * | 5/2007 | Rosenkranz | F16B 13/065 411/60.2 |
| 2008/0253858 A1 * | 10/2008 | Hsieh | F16B 31/02 411/14 |
| 2013/0189041 A1 * | 7/2013 | Abe | B25F 5/00 408/5 |
| 2014/0345110 A1 | 11/2014 | Schmidt et al. | |
| 2015/0063941 A1 * | 3/2015 | Hsieh | G01L 5/24 411/14 |
| 2015/0247520 A1 * | 9/2015 | Hsieh | F16B 31/02 411/14 |
| 2017/0160238 A1 | 6/2017 | Etoh et al. | |

FOREIGN PATENT DOCUMENTS

| | | |
|---|---|---|
| DE | 4243878 | 7/1994 |
| DE | 4421959 A1 | 1/1996 |
| DE | 4427244 | 2/1996 |
| DE | 19705346 C1 | 1/1999 |
| DE | 102012201293 | 8/2013 |
| EP | 0514342 A1 | 11/1992 |
| JP | H0478315 U | 7/1992 |
| JP | H0658311 | 3/1994 |
| JP | H07197457 A | 8/1995 |
| WO | WO 2015/150544 A2 | 10/2015 |
| WO | WO2016013236 | 1/2016 |

* cited by examiner

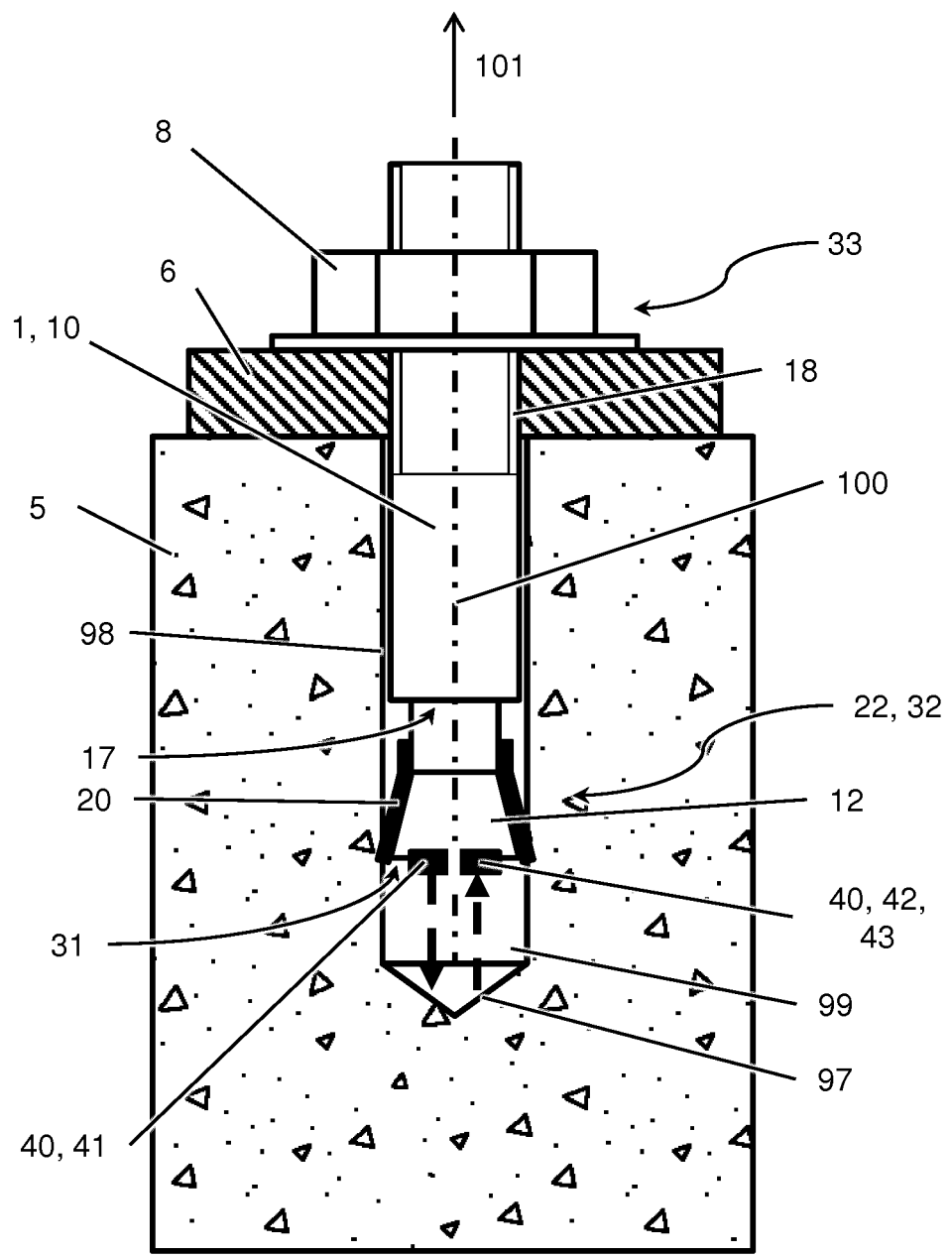

DISTANCE SENSOR AT ANCHOR TIP

The present invention relates to a fastening system according to the definition of the species in claim 1. A fastening system of this type includes an anchor, which has an anchor area in a front area for anchoring the anchor in a hole in a substrate, and a load receiving device in a rear area for introducing a tensile force. The present invention also relates to a measuring method, using a fastening system of this type.

BACKGROUND

Expansion anchors for fastening systems are known, for example, from EP 0514342 A1. They are inserted into a hole in a substrate of a component, e.g. a wall or a ceiling, and then pretensioned by tightening a nut situated on the bolt of the expansion anchor. During the pretensioning of the bolt, an expansion body situated on the bolt is drawn into a dowel body designed as an expansion sleeve, whereby the dowel body is expanded radially and forced radially to the outside, and the expansion dowel is anchored thereby in the substrate. Torque wrenches may be used in expansion anchors to apply a defined pretension.

DE 4421959 A1 describes a pretension control element designed as a kind of washer, which is used on an expansion anchor and which is intended to make the reaching of the necessary pretension detectable.

DE 4037077 A1 describes a device for the fiber-optic measurement of the pretension in a heavy duty anchor, in which the fiber-optic waveguide used for the measurement is situated in a pressure-distributing washer.

WO 2015/150544 A2 describes a screw having an integrated sensor, which transmits light into a blind hole running axially in the interior of the screw and evaluates an echo signal. Information on a deformation of the screw and a tensile load of the screw is obtained from this signal.

DE 19705346 C1 shows a device for manufacturing and monitoring a screw connection, with the aid of which two components are pressed together with a predetermined pretensioning force. According to DE 19705346 C1, a measuring bore designed as a blind hole and running axially in the screw is provided, at which a depth measurement is carried out, a corresponding depth measuring device being situated externally, namely in the screw tool of an automatic screwdriver or manual screwdriver. A signal closely correlated with pretensioning force is obtained during the depth measurement.

SUMMARY OF THE INVENTION

It is an object of the present invention to provide a fastening system, including an anchor, and a measuring method on a fastening system of this type, with the aid of which a particularly powerful and reliable fastening is particularly easily possible, The present invention provides a fastening system having a sensor for measuring a distance of the front area from a reference position of the substrate is provided.

The present invention is based on the finding that the pretension in the bolt, which is generally of central importance for the action in pure screw connections made up of screws, nuts and washers, and which is therefore frequently monitored by sensors in the prior art, may be of lesser importance in anchors designed as expansion anchors. After all, the expansion mechanism of an anchor designed as an expansion anchor makes it possible, due to the expansion principle, to reexpand the anchor in such a way that an anchoring of the expansion anchor is frequently still possible even after the pretension has subsided.

It has furthermore been found that, in expansion anchors of this type, the position of the front area along the hole, i.e. the position of the area in which the anchor area including the expansion mechanism is situated, and in particular changes in this position over time, may be more advantageous indicators of the instantaneous performance of the fastening system. Namely, the initial expansion and possibly a subsequent reexpansion are thus regularly associated with a displacement on the expansion mechanism. As a result, an in particular automatic monitoring of the position of the front area assigned to the expansion mechanism in the hole may facilitate a monitoring of the expansion behavior and thus the anchoring behavior, which may particularly easily increase the performance and reliability of fastening systems.

This is where the present invention comes into play and provides a sensor which may measure the distance of the front area of the anchor, in particular the front area of its bolt, from a reference point situated on the substrate or in the substrate, and may output a signal, in particular an electrical signal, correlated to this distance. This is based on the finding that the substrate, for example a concrete substrate, is comparatively stiff in the typical applications of an anchor, and therefore undergoes little deformation during regular operation. A reference point situated on the substrate is therefore generally comparatively positionally stable relative to the hole in which the anchor is anchored. With the aid of a distance measurement according to the present invention, relevant position data of the anchor in the hole may thus be particularly easily and reliably detected, which, as explained above, in turn permits conclusions to be drawn about possible changes in the expansion behavior of the expansion anchor and thus the load bearing capacity of the fastening system. Possible damage may also be detected. As a result, a particularly powerful and reliable fastening with the aid of expansion anchors may be particularly easily facilitated with the aid of the sensor according to the present invention.

Besides the described determination of the displacement of the front area relative to the hole and/or to the surrounding substrate, the signals received from the sensor according to the present invention may also be used for the direct or indirect determination of other parameters, for example to determine external forces or the stiffness of the system.

The anchor used in the fastening system according to the present invention may be, for example, an expansion anchor. An expansion anchor may be understood to be, in particular, an anchor which includes an expansion mechanism in its anchor area, which expands and extends radially for anchoring the expansion anchor, due to mechanical effects, preferably in the case of tensile forces in the bolt of the anchor, whereby the expansion anchor is anchored on the wall of the hole. The expansion anchor may also be designed as an undercut anchor which is anchored in an undercut of the hole, which is created ahead of time using a separate tool or by the anchor itself.

However, the anchor may also be a compound anchor. A compound anchor may be understood to be, in particular, an anchor which is fixed in the hole with the aid of a hardenable compound.

The load receiving device is used to introduce a tensile force, which is oriented, in particular, in the extraction direction, and particularly preferably also a transverse force, into the anchor, in particular into its bolt. It may be situated, in particular, on the bolt. The load receiving device is designed as a male thread. However, it may also be designed as a female thread or as a head.

Since the front area is situated close to the tip of the anchor, the front area may also be referred to as the tip area. The front area is preferably a front end area. It may extend, for example, over a maximum of 50%, 30% or 10% of the length of the anchor. The rear area is advantageously situated opposite the front area. The front area, in which the anchor area is situated, may be, in particular, a front area of the bolt of the anchor. The rear area may be, in particular, a rear area of the bolt of the anchor.

The sensor is used to determine the position of the anchor in its operating state, i.e. when the anchor is inserted into the hole and, in particular, anchored there. Accordingly, the sensor may be provided, in particular, to measure a distance of the front area situated in the hole from the reference position of the substrate. If necessary, the sensor according to the present invention may also be combined with other sensors, for example with a sensor for determining the pretension in the bolt of the anchor.

The fastening system according to the present invention may encompass the substrate, including the hole for accommodating the anchor. However, the substrate may also be viewed as a part separate from the fastening system. The substrate may be advantageously made from a mineral construction material, preferably concrete.

The reference position may be provided on the wall of the substrate, for example on the wall of the hole, on the base of the hole or on the outer surface of the substrate at a distance from the hole. The reference position may also be located in the interior of the substrate, where it may be defined, for example by a reference object embedded in the substrate, for example an embedded reference magnet. The reference position may thus be located on the substrate but also within the substrate.

It is particularly preferred that the sensor is integrated into the anchor, which may involve, in particular, all sensor components being situated on the anchor. Since the sensor is installed together with the anchor in this case, a particularly high user-friendliness and a particularly high reliability may exist.

However, it may also be provided that at least one element of the sensor, for example a reference element, is separate from the anchor, which may involve, in particular, this element and the anchor being separate parts. For example, a transmitter element of the sensor may be situated in the substrate and a receiver element on the anchor. This may be advantageous with regard to the measurement accuracy, since at least one element may be situated at the reference position. Moreover, a configuration of this type may have cost advantages, for example if multiple sensors share one element, for example a transmitter element. In principle, the sensor may also be completely separate from the anchor, for example if the sensor is a laser triangulation sensor or includes a coil, into which the bolt of the anchor is inserted. However, at least one element of the sensor is preferably situated on the anchor, in particular on its bolt.

The sensor could be based on the following measuring principles, among other things:
1. Measurement between the anchor and the base of the hole with the aid of
ultrasound, for example a propagation time measurement
2. Measurement between a detector element and a reference element:
a reference element, for example a magnet or rebar, embedded in the substrate or on the substrate surface (for example on the hole base, on the wall of the hole or outside the hole) and a detector element, for example a magnetic field detector, on the anchor;
a detector element embedded in the substrate or on the substrate surface and a reference element on the anchor.
3. Measurement between the anchor and the wall of the hole
Detection of the surface structure of the wall of the hole, for example with the aid of a camera or by scanning the geometry.

As already mentioned several times, it is advantageous that the anchor includes a bolt. The front area, whose distance from the reference position is determined with the aid of the sensor, is preferably a front area of the bolt, i.e. it is preferred that the sensor is provided for measuring a distance of the front area of the bolt from a reference position of the substrate. After all, the knowledge of the position of the front area of the bolt, i.e. in particular the area in which an expansion body for a dowel body is provided in an expansion anchor, permits particularly easy conclusions to be drawn about the status of the anchor. In particular, therefore, according to the present invention, a fastening system including an anchor having a bolt may be provided, the anchor having an anchor area in a front area of the bolt for anchoring the anchor in a hole in a substrate and having a load receiving device in a rear area, in particular of the bolt, for introducing a tensile force, preferably into the bolt, a sensor being provided for measuring a distance of the front area of the bolt from a reference position of the substrate.

As already mentioned further above, it is particularly preferred that the anchor is an expansion anchor which includes a dowel body adjacent to the bolt in its anchor area, in particular an expansion sleeve, as well as an expansion body for the dowel body provided on the bolt. In expansion anchors of this type, the measured values obtained with the aid of the sensor according to the present invention may be particularly meaningful. The anchor may be, in particular, an expansion anchor of the force-controlled expanding anchor type.

The expansion body may be provided, in particular, to radially displace the dowel body during the axial displacement of the expansion body relative to the dowel body, i.e. the dowel body is displaced radially to the outside by the expansion body and pressed against the wall of the hole in the substrate when the expansion body is axially moved relative to the dowel body in the extraction direction of the bolt. During this operation, which may be effectuated, in particular, by a bevel provided on the expansion body, and in which the dowel body, which is preferably designed as an expansion sleeve, may also be expanded, the expansion anchor is anchored in the hole. The extraction direction preferably runs in parallel to the longitudinal axis of the bolt and/or points out of the hole. In particular, the distance of the surface of the expansion body from the longitudinal axis of the bolt increases on the expansion body against the extraction direction.

It is particularly advantageous that the dowel body is an expansion sleeve which surrounds the bolt, at least in areas, and/or that the expansion body is an expansion cone. A particularly uniform introduction of force in the circumferential direction is achieved hereby. The angular extension of the expansion sleeve around the longitudinal axis of the bolt is at least 270°. The expansion cone is provided to spread the expansion sleeve, i.e. to radially expand the expansion sleeve. The expansion cone may have a mathematically strictly conical surface, although this is not necessary.

In particular, the direction vector of the extraction direction of the expansion body may be oriented toward the load receiving device. The distance of the surface of the expansion body from the longitudinal axis of the bolt preferably increases as the distance from the load receiving device increases. The dowel body is movably situated, in particular, along the bolt, in particular fastened thereto. To the extent that "radial" and "axial" are mentioned, this applies, in particular, to the longitudinal axis of the bolt and/or the anchor, which may be, in particular, the axis of symmetry and/or the center axis of the bolt or the anchor.

It is particularly preferred that at least one element of the sensor, in particular a transmitter element or a receiver element, is situated on the bolt. The entire sensor is preferably situated on the bolt. In an arrangement of this type, the distance of the front area of the bolt from the reference position may be particularly easily ascertained.

The sensor advantageously includes a transmitter element for transmitting a signal exiting on the front side of the bolt. This may be advantageous with regard to the measurement accuracy and reliability. The signal may be, for example, an ultrasonic signal.

The transmitter element is preferably situated on the front end face of the bolt, which may be advantageous with regard to the energy expenditure, the measurement accuracy and the manufacturing complexity. The front end face does not necessarily have to be flat but may, for example, also have a blind hole, in which the transmitter element and/or the receiver element, described farther below, is/are situated.

The sensor preferably includes a receiver element for detecting a signal reflected from the substrate, in particular a signal reflected from the substrate to the bolt. This may also be advantageous with regard to the measurement accuracy and reliability. The reflected signal may be, in particular, a signal transmitted by the transmitter element and reflected by the substrate, for example its surface. For example, the sensor may be configured for a propagation time measurement, in particular if the signal is an ultrasonic signal.

The transmitter element is advantageously situated on the front end face of the bolt, which may be advantageous with regard to the energy expenditure, the measurement accuracy and the manufacturing complexity.

Another preferred embodiment of the invention is that the fastening system includes an evaluation unit, which is able to evaluate a signal generated by the sensor at different points in time for the purpose of determining a possible displacement of the anchor, in particular a displacement of its bolt. Accordingly, therefore, not only a position of the front area but also a change in this position over time, thus a displacement of the front area, are detected. A measurement of this type may be particularly meaningful with regard to the load behavior of anchors. In particular, the sensor may thus generate a signal, preferably an electrical signal, correlated with the displacement of the anchor, particularly preferably a signal, preferably an electrical signal, correlated with the displacement of the bolt of the anchor.

If the anchor is designed as an expansion anchor, it is preferably a bolt-type expansion anchor. In an expansion anchor of this type, the expansion body is drawn into the dowel body when the expansion anchor is set, due to an axial displacement of the bolt relative to the dowel body. In a bolt-type expansion anchor, the bolt preferably has a one-piece design; in particular, the expansion body is designed to form a single piece with adjacent bolt areas. A stop, for example an annular shoulder, may preferably be formed on the bolt, which limits a displacement of the dowel body away from the expansion body.

Alternatively, the expansion anchor could be a sleeve-type expansion anchor. In a sleeve-type expansion anchor, the bolt includes an anchor rod which is separate from the expansion body, the expansion body preferably being connected to the anchor rod via corresponding threads. The drawing of the expansion body into the dowel body when setting the expansion anchor may then be preferably at least partially effectuated by a rotation of the anchor rod relative to the expansion body, which is converted into an axial movement of the expansion body relative to the anchor rod by a spindle drive, which is formed by the corresponding threads. In a sleeve-type expansion anchor, in particular, the dowel body, which may also have a multi-part design, may also extend up to the mouth of the hole.

The present invention also relates to a measuring method, in which a fastening system according to the present invention is provided, and a signal correlated with the distance of the front area from the reference position is generated with the aid of the sensor. Accordingly, the sensor is used as intended.

In particular, it may be provided that the signal correlated with the distance of the front area from the reference point is evaluated to determine a possible displacement of the anchor at different points in time. Accordingly, therefore, not only a position of the front area but also a change in this position over time, thus a displacement of the front area, are detected A measurement of this type may be particularly meaningful with regard to the load behavior of anchors.

The present invention is explained in greater detail below on the basis of preferred exemplary embodiments, which are represented schematically in the attached figure, it being possible, in principle, to implement individual features of the exemplary embodiments illustrated below individually or in an arbitrary combination within the scope of the present invention.

BRIEF DESCRIPTION OF THE DRAWINGS

FIG. 1 schematically shows a partially longitudinal sectional view of one specific embodiment of a fastening system according to the present invention.

DETAILED DESCRIPTION

FIG. 1 shows an exemplary embodiment of a fastening system according to the present invention. As illustrated in FIG. 1, the fastening system includes a substrate 5 having a hole 99 as well as an anchor 1, which is designed, for example, as an expansion anchor and which is anchored in hole 99.

Anchor 1, in turn, includes a bolt 10 and a dowel body 20, designed as an expansion sleeve, which surrounds bolt 10 in an anchor area 22 situated in a front area 32 of bolt 10. In anchor area 22, bolt 10 includes an expansion body 12 for dowel body 20, which is illustrated, for example, as an expansion cone. On expansion body 12, bolt 10 expands from the back to the front (i.e. at an increasing distance from a load receiving device 18 described in greater detail below), and the cross section of bolt 10 increases from the back to the front along bolt 10 as the distance of the bolt surface from longitudinal axis 100 of bolt 10 increases. Expansion body 12 may force dowel body 20 radially to the outside when expansion body 12, in particular bolt 10, is moved axially together with expansion body 12 relative to dowel body 20 in extraction direction 101. Dowel body 20 may be pressed against a wall 98 of hole 99 hereby, and anchor 1 may be anchored in hole 99. Expansion body 12 and dowel body 20 thus form an expansion mechanism situated in anchor area 22 for anchoring anchor 1 in hole 99.

In a rear area 33 of bolt 10 situated opposite front area 32, bolt 10 includes a load receiving device 18 for introducing a tensile force directed in extraction direction 101 into anchor 1, in particular into its bolt 10. Load receiving device 18 in this case is illustrated, for example, as a male thread.

Bolt 10 of anchor 1 runs through an attachment part 6 into hole 99 in substrate 5, front area 32 of anchor 1 being situated in hole 99 in substrate 5, and rear area 33 of anchor 1 being situated outside hole 99, at least in areas. A nut 8 is screwed onto load receiving device 18 designed as a male thread, which holds attachment part 6 on anchor 1 and thus on substrate 5. By tightening nut 8, a tensile force directed in extraction direction 101 may be applied to bolt 10, which actuates the expansion mechanism.

Bolt 10 preferably has a stop 17 designed for example as an annular step for dowel body 20 designed as an expansion sleeve, stop 17 limiting a movement of dowel body 20 relative to bolt 10 toward the rear, in particular toward rear area 33.

When anchor 1 is set, bolt 10 is pushed into hole 99 against extraction direction 101 in parallel to longitudinal axis 100 of bolt 10, leading with front area 32. Due to stop 17, dowel body 20 designed as an expansion sleeve is also introduced into hole 99 in substrate 5. Bolt 10 is then extracted again a short distance from hole 99 in extraction direction 101, which runs in parallel to longitudinal axis 100, for example by tightening nut 8. Due to its friction with wall 98 of hole 99, dowel body 20 designed as an expansion sleeve remains behind, and a displacement of bolt 10 relative to dowel body 20 occurs. During this displacement, expansion body 12 of bolt 10 penetrates deeper and deeper into dowel body 20 in such a way that dowel body 20 is radially expanded by expansion body 12 and is pressed against wall 98 of hole 99. Due to this mechanism, anchor 1 is fixed in substrate 5.

The fastening system also includes a sensor 40, which, in turn, has a transmitter element 41 and a receiver element 42, including an evaluation unit 43. In the present exemplary embodiment, both transmitter element 41 and receiver element 42 are situated on anchor 1, in particular on its bolt 10. In principle, however, one of these elements 41 or 42 may also be situated, for example, on substrate 5.

In particular, both transmitter element 41 and receiver element 42 are situated on front end face 31, i.e., in particular, on the end face which closes bolt 10 toward the front, which is opposite base 97 of hole 99 and/or which limits front area 32 toward the front.

As indicated by an arrow in FIG. 1, transmitter element 41 transmits an acoustic signal, in particular an ultrasonic signal, which exits on the front side of bolt 10. This acoustic signal is reflected by substrate 5, in particular by base 97 of hole 99, in the direction of bolt 10, and the reflected signal is detected by receiver element 42 on bolt 10. Sensor 40 evaluates the propagation time of the reflected signal and generates a signal therefrom, which correlates with the axial position of sensor 40 and thus with the axial position of front area 32 in hole 99, in particular an electrical signal correlated with the distance of front area 32 from base 97 of hole 99.

The electrical signal correlated with the axial position of front area 32 in hole 99 is evaluated by evaluation unit 43 of sensor 40 at different points in time. Based on this evaluation, sensor 40, in particular its evaluation unit 43, generates a signal, in particular an electrical signal, correlated with a displacement of bolt 10 in hole 99. This signal may permit conclusions to be drawn about the load bearing capacity of anchor 1.

The invention claimed is:

1. A fastening system comprising:
    an anchor having an anchor area in a front area for anchoring the anchor in a hole in a substrate;
    a load receiving device in a rear area for introducing a tensile force; and
    a sensor integrated into the anchor for measuring a distance of the front area from a reference position of the substrate.

2. The fastening system as recited in claim 1 wherein at least one element of the sensor is separate from the anchor.

3. The fastening system as recited in claim 1 wherein the anchor includes a bolt, and the sensor is provided for measuring a distance of the front area of the bolt from a reference position of the substrate.

4. The fastening system as recited in claim 3 wherein the anchor is an expansion anchor including a dowel body adjacent to the bolt in an anchor area of the bolt, as well as an expansion body for the dowel body provided on the bolt.

5. The fastening system as recited in claim 4 wherein the dowel body is an expansion sleeve.

6. The fastening system as recited in claim 3 wherein at least one element of the sensor is situated on the bolt.

7. The fastening system as recited in claim 3 wherein the sensor includes a transmitter element for transmitting a signal, the signal exiting on a front side of the bolt.

8. The fastening system as recited in claim 7 wherein the transmitter element is situated on a front end face of the bolt.

9. The fastening system as recited in claim 3 wherein the sensor includes a transmitter element situated on a front end face of the bolt.

10. The fastening system as recited in claim 9 wherein the sensor includes a receiver element also situated on the front end face of the bolt.

11. The fastening system as recited in claim 1 wherein the sensor includes a receiver element for detecting a signal reflected by the substrate.

12. The fastening system as recited in claim 11 wherein the receiver element is situated on a front end face of the bolt.

13. The fastening system as recited in claim 1 further comprising an evaluation unit capable of evaluating a signal generated by the sensor at different points in time to determine a possible displacement of the anchor.

14. A measuring method for use with the fastening system as recited in claim 1, the method comprising: generating a signal correlated with the distance of the front area from the reference position with the aid of the sensor.

15. The measuring method as recited in claim 14 wherein the signal correlated with the distance of the front area from the reference point is evaluated at different points in time to determine a possible displacement of the anchor.

16. The fastening system as recited in claim 1 wherein the sensor includes an ultrasonic transmitter.

17. The fastening system as recited in claim 1 wherein the sensor is configured for a propagation time measurement of a signal.

* * * * *